Feb. 2, 1943. H. VOLKS 2,310,157
GRILL AND CHAFING DISH
Filed May 14, 1940 3 Sheets-Sheet 1

INVENTOR
Herbert Volks
BY Edwards, Bower & Pool
ATTORNEY

Feb. 2, 1943.   H. VOLKS   2,310,157
GRILL AND CHAFING DISH
Filed May 14, 1940   3 Sheets-Sheet 2
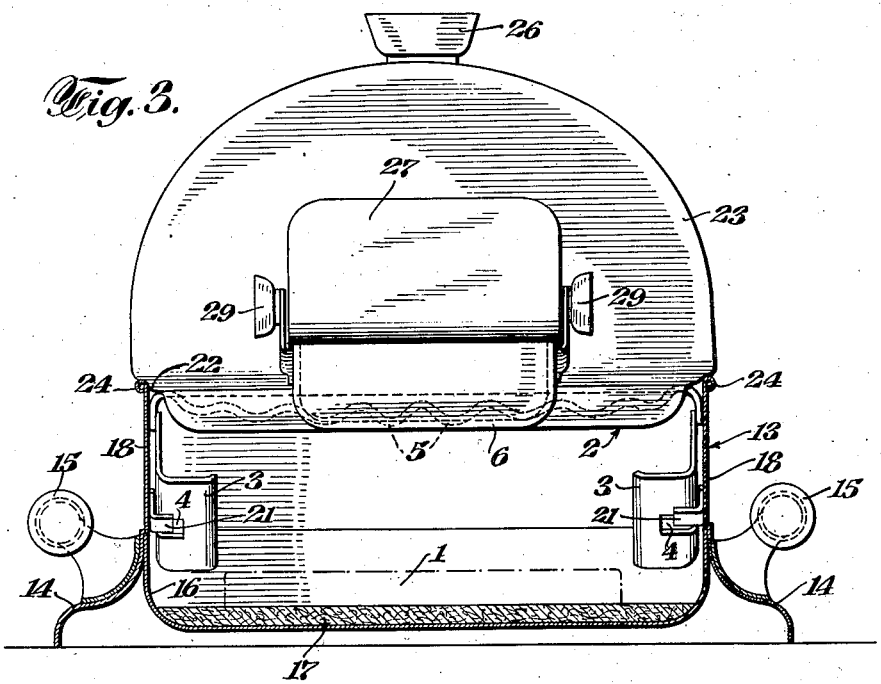
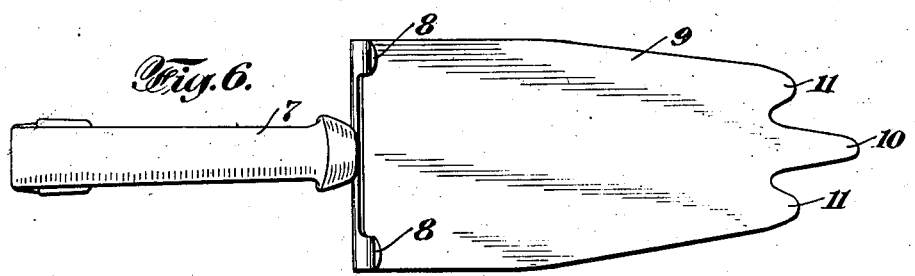
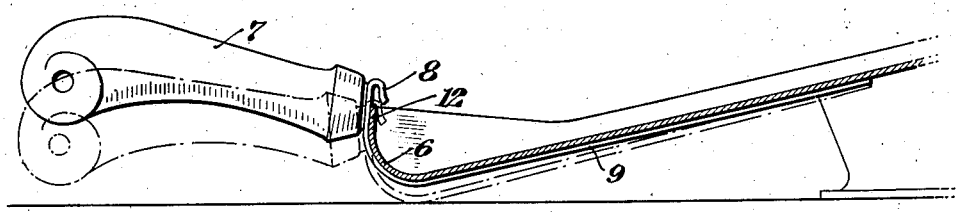
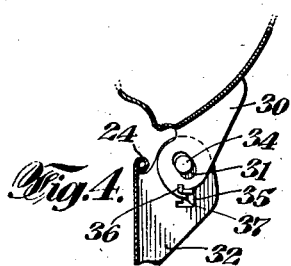
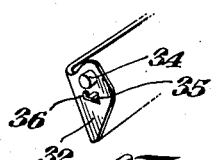
INVENTOR
Herbert Volks
BY Edwards, Bower+Pool
ATTORNEY Feb. 2, 1943. H. VOLKS 2,310,157
GRILL AND CHAFING DISH
Filed May 14, 1940 3 Sheets-Sheet 3
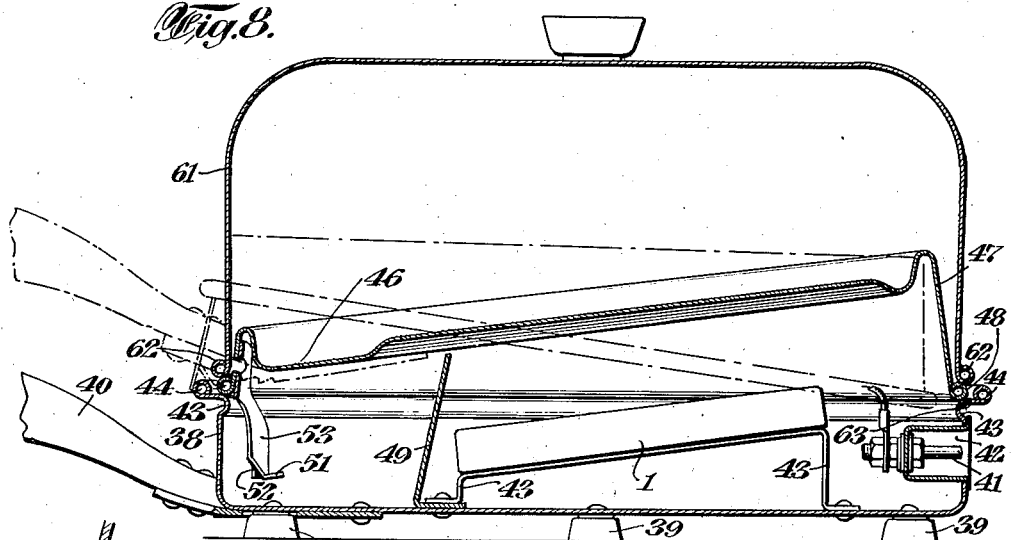
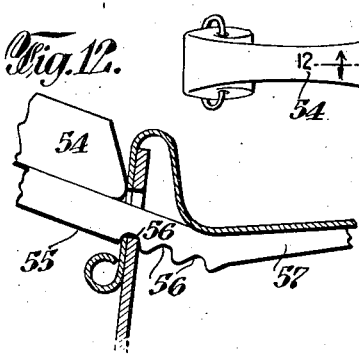
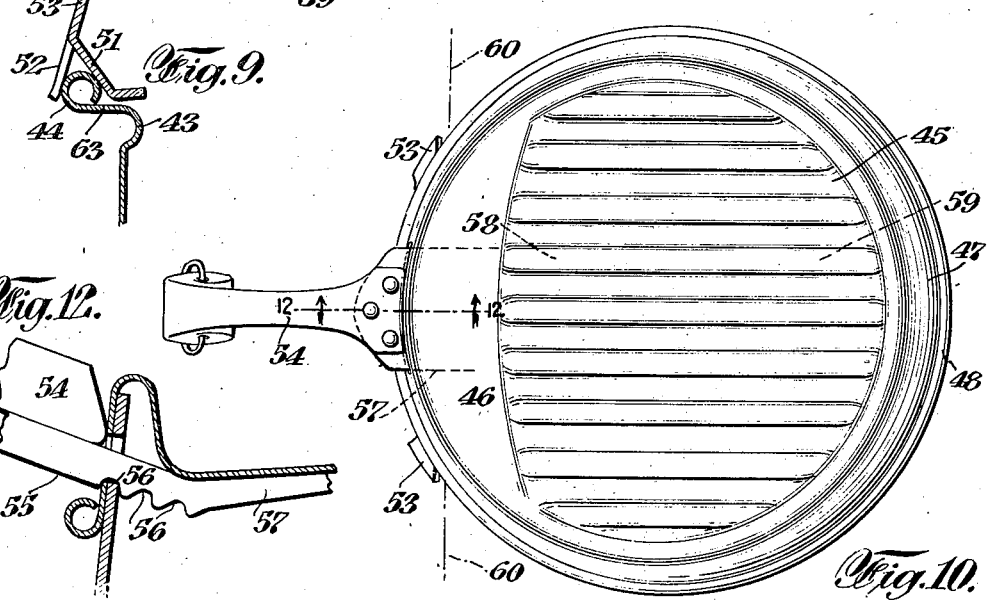
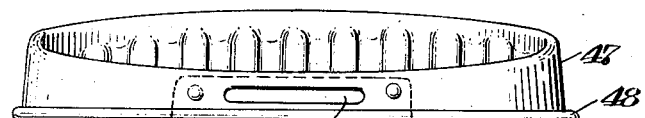
INVENTOR Herbert Volks
BY Edwards, Bower + Pool
ATTORNEY Patented Feb. 2, 1943

2,310,157

UNITED STATES PATENT OFFICE 2,310,157

GRILL AND CHAFING DISH

Herbert Volks, New York, N. Y., assignor to Sulzer Freres, S. A., Winterthur, Switzerland, a corporation of Switzerland Application May 14, 1940, Serial No. 335,044

4 Claims. (Cl. 53—5)

My invention relates to improvements in cooking grills adapted to be placed on the table.

An object of my invention is to provide a table grill adapted to cook meat and the like with a minimum of smoke and which may be adapted to fit into a chafing dish provided with heating means adapted either to cook the meat or to keep it warm indefinitely without loss of flavor.

In broiling meat and the like, the heat of the grill is sufficiently high to cause too rapid vaporization of juice and even burning of grease, thus destroying the aroma of the food and creating smoke. This may be avoided or at least minimized by providing the grill with grooves adapted to drain off such juice and grease to a relatively cool place. I have found that once the meat has been cooked it may be kept warm indefinitely without loss of flavor provided it is kept in a warm vapor of its own juices.

In my improved grill and chafing dish I have provided means whereby the grease and juices drain into a relatively cool reservoir while the food is cooking, thus reducing smoke from burning of the grease to a minimum and retaining the juice. When the meat has been cooked the grill is placed horizontally in my improved chafing dish, and the juices and grease flow back to a position under the meat. Heating means in the chafing dish warm the juices and grease under the meat slowly vaporizing the juices. The vapor so produced envelops the meat and keeps it warm without further cooking or loss of flavor.

My invention is illustrated in the drawings hereto, in which.

Fig. 3 discloses a front view of my improved grill with the front walls of the chafing dish and juice pan removed;

Figs. 4 and 5 are detailed views of ears for removably connecting chafing dish to cover;

Figs. 6 and 7 are respectively a plan view and elevation of combined serving spatula and holder for moving the grill;

Fig. 8 is a cross section of another form of grill and chafing dish embodying my invention;

Fig. 9 is a detailed view of one of the bifurcated front feet of the grill shown in Fig. 8 when in a horizontal position;

Figs. 10 and 11 are respectively a plan view and a front elevation of the grill shown in Fig. 8, and Fig. 12 is a cross section taken along line 12—12 of Fig. 10 and represents a handle in position for moving the grill.

Figure 1:
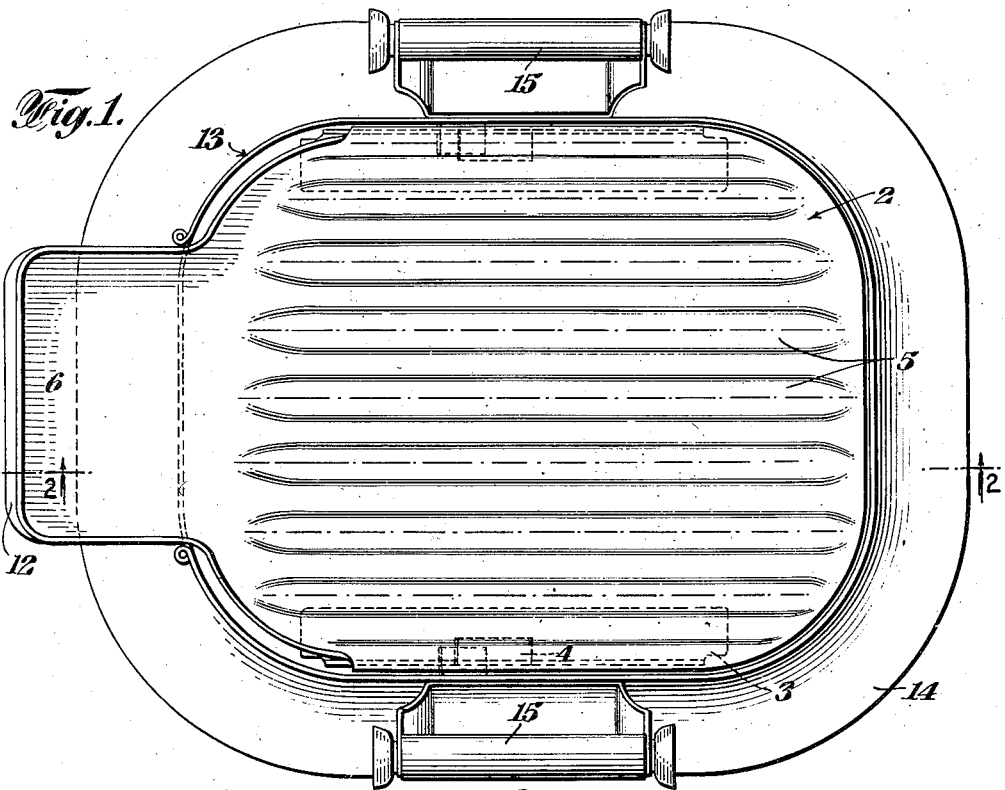
Fig. 1 represents a plan view of my improved table grill and chafing dish with the cover removed.
Figure 2:
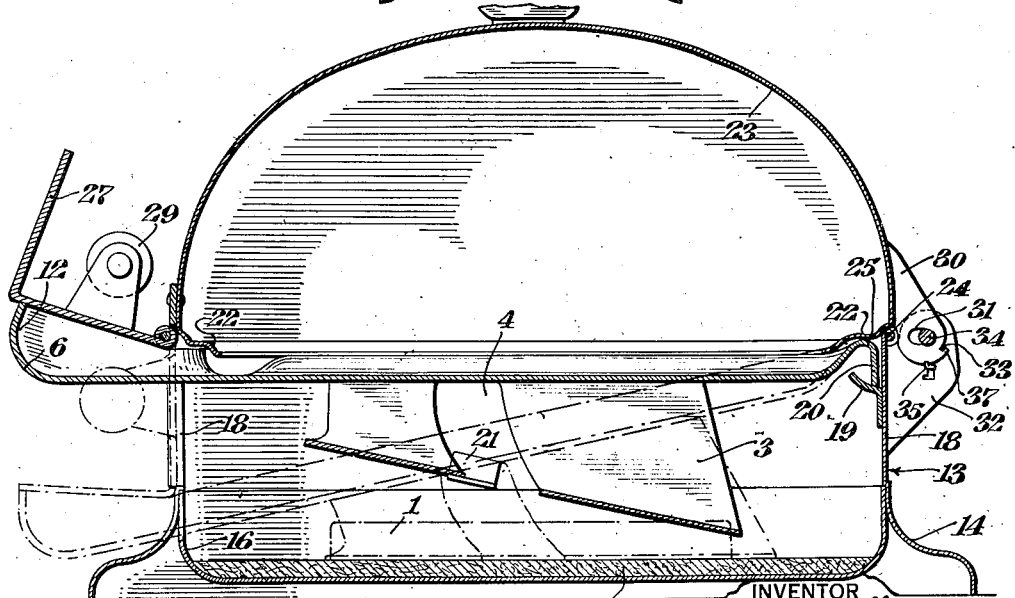
Fig. 2 is a cross section along the line 2—2 of Fig. 1 and shows my improved grill, chafing dish and cover.

In the form illustrated in Fig. 1 to Fig 3, inclusive, my grill may be used for cooking meat and the like either on an ordinary stove or on the table by means of electrical heating unit 1 (Figs. 2 and 3) in the chafing dish.

My improved grill consists of a sheet of corrugated metal 2 (Figs. 1 and 3) held in an inclined position by slotted bracket shaped supports 3 (Figs. 2 and 3) when the grill is in operative position. When in such position, troughs 5 of the corrugated sheet quickly drain the grease and meat juices into juice pan 6 which is at a point removed from the source of heat and relatively cool thereby avoiding burning of the grease with a corresponding reduction of smoke, and minimizing too rapid vaporization of the juices. The cooking may be performed on a gas, oil or any of the other ordinary types of kitchen stove.

When the meat is cooked the grill is lifted off the stove by means of the spatula shown in Figs. 6 and 7. Such spatula consists of a handle 7, a pair of hook shaped members 8, 8 adapted to hook over the front edge 12 of juice pan 6 and a flat portion 9, terminating in fingers 10, 11. Such fingers may be used to clean the grooves of food particles remaining after the grill has been used. Hook members 8 are designed to engage edge 12 near the sides of the juice pan, thereby preventing side slipping of the grill.

The spatula may also be used to serve the food cooked on the grill. When so employed, fingers 10, 11 of the spatula reach under the food and loosen it. In this manner food such as fish which has a tendency to adhere to the grill may be removed readily and neatly without tearing or breaking the food.

The grill is next placed in my improved chafing dish 13 (Figs. 2 and 3). The chafing dish consists of a base portion 14 (Figs. 1, 2 and 3) to which handles 15 are attached. A pan shaped member 16 (Figs. 2 and 3) fastened to the base forms the bottom of the chafing dish. The bottom of pan 16 is covered with insulating material 17, such as asbestos to prevent injury resulting from heat to the table on which the chafing dish is placed. Variable electrical heating unit 1 (Figs. 2 and 3) is supported on insulation 17. Such unit is adjustable and may be employed either to cook the food or merely to keep it warm at the will of the operator. As an alternative to placing the heating unit horizontally as illustrated in the drawings, it may be inclined so as to be parallel to the grill surface when in cooking position.

Side walls 18 (Figs. 1, 2 and 3) likewise supported by base 14, rise above pan 16 and extend around the chafing dish except at the front which is left open (Fig. 1) to permit juice pan 6 to extend beyond the walls of the chafing dish and to permit the grill to be raised and lowered as hereinafter described.

Bracket 19 (Fig. 2) is fastened to wall 18 at the back of the chafing dish and supports the down turned rear edge 20 of the grill when in the chafing dish. Brackets 21 (Figs. 2 and 3) are attached to wall 18 at the side of the chafing dish and provide rests for supports 3 of the grill when in position for serving the food. Brackets 19 and 21 thus hold the grill in a horizontal position thereby permitting the juice to flow back from juice pan 6 to the troughs 5 of the corrugated grill surface. By means of this the juices are located under the food.

As illustrated in Fig. 3 the center corrugations are deeper than those at the sides of the grill, so that the juice will flow first into the center corrugations and will spread to the sides only when the center portions of the grill have been supplied with juice. Heat from unit I then warms the juices and the food is enveloped in a vapor of its own juice.

If desired, cooking may be performed in the chafing dish. The grill is pulled forward slightly until brackets 21 come within slots 4 of supports 3 (Figs. 2 and 3). The front portion of the grill then drops down until supports 3 rest upon insulation 17. Heat from electrical unit I cooks the food and the grease and juice therefrom runs off into juice pan 6. When the food has been cooked the grill is raised and moved back until supports 3 again rest on brackets 21, in which position the food is ready for serving.

In preparing certain types of food it is desirable to use a cover during cooking. In Figs. 2 and 3 I have illustrated a suitable cover which will fit upon either the grill or the chafing dish. A curved flange 22 on the bottom of cover 23 is designed to rest upon the curled top 24 of side walls 18 when the cover is used with the chafing dish. Should it be desired to use the cover with the grill alone, flange 22 is curved to rest upon the curved edge 25 of the grill. A handle 26 is provided for removing the cover.

Hinged to the front of cover 23 is a plate 27, bent approximately 90 degrees and provided with handles 29 (Figs. 2 and 3) by means of which the plate may be raised or lowered to respectively uncover or cover juice pan 6 as desired by the operator. When the grill is lowered in the chafing dish in position for cooking hinge 28 permits plate 27 to drop and cover the juice pan. Thus regardless of whether the grill is horizontal or inclined, the juice pan may be kept covered or not as the operator wishes.

Ears 30 (Figs. 2 and 4) having slots 31 and 33 are fastened to the back of cover 23 and cooperate with ears 32 (Figs. 2, 4 and 5) attached to the back wall of the chafing dish. Ears 32 are provided with trunnions 34 and brackets 35 having upwardly extending lugs 36.

When the cover is on the chafing dish (Fig. 2) slots 31 fit over trunnions 34 which act as pivots, while lugs 36 prevent ears 30 from slipping sidewise off the trunnions. If the operator should desire to remove the cover, the latter is raised until extensions 37 on ears 30 pass lugs 36. The cover may then be readily slipped off the trunnions and removed.

Another form of grill embodying my invention is illustrated in Figs. 8 to 12, inclusive. In this embodiment the lower portion of the combined grill and chafing dish consists of a circular pan shaped portion 38 (Fig. 8) mounted on insulated feet 39 and equipped with a handle 40. Electrical terminals 41 set in recesses 42 at the rear of the chafing dish are connected with electric heating unit I which is mounted on brackets 43 within the lower portion of the chafing dish. The upper walls of said lower portion terminate in annular beads 43 and 44.

The grill consists of a circular corrugated cooking surface 45 (Fig. 10) adapted to drain into a shallow crescent shaped trough 46 when in operative condition. An annular apron 47 terminating in bead 48 rests upon bead 43, thus supporting the grill in an inclined position while cooking is in progress (Fig. 8). Metal plate 49 deflects heat toward the center of the cooking surface and away from trough 46, which is removed from close proximity to heating unit I in order to minimize burning of grease.

When the food has been cooked, a holder is inserted in slot 50 (Fig. 11) in the front portion of the grill. The cooking surface is then raised and slipped forward until prongs 51 and 52 of the bifurcated front feet 53 of the grill rest upon outer bead 44 of the lower portion of the chafing dish (Fig. 9). The grill is thus held horizontally, enabling a portion of the juices to flow back under the food.

A holder suitable for moving the grill is illustrated in Fig. 12. Such holder comprises a handle 54 of wood or the like to which is attached a metal plate 55 having arcuate indentations on the underside thereof adapted to grip the lower edge of slot 50. Plate 55 terminates in a flat portion 57 having tines adapted to fit under the corrugations of the grill surface.

If desired the grill may be used in connection with an ordinary gas stove. When so employed the grill should be placed at the front of the stove so that front legs 53 of the grill hang over the edge 60 of the stove (Fig. 10) while food is being cooked. The grill is thus supported on annular bead 48 in an inclined position, and gas burner 59 is located under the central portion of the corrugated cooking surface. When the cooking is completed the grill is raised to a horizontal position by a handle of the type shown in Fig. 12 and held in that position by front feet 53 of the grill.

Finally, a circular cover 61 is provided as shown in Fig. 8. The edge of this cover consists of a bead 62 and is adapted to rest either upon bead 48 of the grill or on annular platform 63 between beads 43 and 44 of the lower portion of the chafing dish. As so designed the cover may be used either with the grill or with the lower portion of the chafing dish as desired.

My improved grill and chafing dish minimize smoking, preserve aroma and will keep food warm indefinitely without loss of flavor. Moreover the various parts of my improved table grill are adapted to a variety of uses. Thus the grill may be heated by an ordinary type of kitchen stove or by the chafing dish; the cover will fit either chafing dish or grill; the chafing dish can either cook the food or merely keep it warm and will support the grill either horizontally or on an incline, and my holder is adapted both to lift the grill and to serve the food. In addition my chafing dish and grill present an attractive appearance and may be used on the table.

Instead of or together with the corrugated plate one may use a plain pan or a perforated plate for cooking different sorts of food such as potatoes, vegetables, etc.

The grill as disclosed herein, and particularly in Figs. 8-12, inclusive, and not claimed herein, is claimed in applicant's co-pending application Serial No. 471,007.

I claim:

1. A chafing dish adapted to hold a cooking surface in either an inclined or horizontal position which includes heating means, walls open on one side permitting a portion of said cooking surface to project beyond the open side of the chafing dish, and bracket means attached to the side and rear walls of the chafing dish, said cooking surface resting on said brackets horizontally by supports dimensioned and positioned to clear the brackets and permit said surface to assume an inclined position when said surface is moved forward and off the side brackets.

2. A chafing dish as set forth in claim 1 having a bottom supporting said cooking surface in inclined position and covered with insulating material retarding downward radiation of heat.

3. The combination of a cooking grill having an inclined corrugated surface adapted to drain juices of meat and the like into a relatively cool reservoir while cooking is in progress, said reservoir permitting juices to flow back into the troughs of said corrugated surface when said surface is horizontal, a chafing dish adapted to hold said grill in horizontal position thereby permitting said juices to flow back into said troughs, and heating means in said chafing dish causing a slow vaporization of the said juices.

4. A combined grill and chafing dish comprising a cover having an edge terminating in an annular bead, a body portion supporting said cover and containing electrical heating means, a corrugated cooking surface draining into a shallow trough at a side of said surface and engaging said cover bead so that the latter is adapted partly to rest on said corrugated cooking surface, said trough being removed from said heating means, means for raising and lowering said cooking surface, and supports for holding said surface in both an inclined and in a horizontal position.

HERBERT VOLKS.